(12) United States Patent
Motoyoshi et al.

(10) Patent No.: US 7,280,587 B2
(45) Date of Patent: Oct. 9, 2007

(54) SPECTRUM SPREAD RECEPTION APPARATUS

(75) Inventors: Katsuyuki Motoyoshi, Tokyo (JP); Kazuaki Ishioka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 580 days.

(21) Appl. No.: 10/477,144

(22) PCT Filed: Feb. 26, 2003

(86) PCT No.: PCT/JP03/02114

§ 371 (c)(1),
(2), (4) Date: Nov. 7, 2003

(87) PCT Pub. No.: WO03/077439

PCT Pub. Date: Sep. 18, 2003

(65) Prior Publication Data

US 2004/0156426 A1    Aug. 12, 2004

(30) Foreign Application Priority Data

Mar. 14, 2002    (JP)    ............................ 2002-069664

(51) Int. Cl.
*H04B 1/00*    (2006.01)
(52) U.S. Cl. .................. 375/150; 375/152; 375/147
(58) Field of Classification Search ............... 375/205, 375/208, 342, 142–150, 233, 152, 140, 130, 375/134, 137, 200, 254, 285, 346–347; 370/142, 370/342, 515; 455/501, 504, 506
See application file for complete search history.

(56) References Cited

U.S. PATENT DOCUMENTS

| | | | | |
|---|---|---|---|---|
| 5,796,775 A | * | 8/1998 | Aoyama | ..................... 375/150 |
| 6,829,291 B1 | * | 12/2004 | Imaizumi | ..................... 375/150 |
| 6,912,243 B1 | * | 6/2005 | Ishioka | ..................... 375/147 |
| 6,996,157 B2 | * | 2/2006 | Ohsuge | ..................... 375/148 |
| 7,003,020 B2 | * | 2/2006 | Sugita | ..................... 375/150 |
| 7,016,400 B2 | * | 3/2006 | Goto | ..................... 375/150 |
| 7,075,974 B2 | * | 7/2006 | Ohsuge | ..................... 375/152 |
| 7,142,587 B2 | * | 11/2006 | Sato | ..................... 375/150 |

FOREIGN PATENT DOCUMENTS

| | | |
|---|---|---|
| EP | 1 126 626 A2 | 8/2001 |
| EP | 1 164 710 A1 | 12/2001 |
| JP | 10-308688 | 11/1998 |
| JP | 2930585 | 5/1999 |
| JP | 2000-269860 | 9/2000 |

* cited by examiner

*Primary Examiner*—Mohammed Ghayour
*Assistant Examiner*—Sophia Vlahos
(74) *Attorney, Agent, or Firm*—Oblon, Spivak, McClelland, Maier & Neustadt, P.C.

(57) ABSTRACT

A matched filter takes a correlation between a plurality of multiplexed spread spectrum signals and a spreading code. A cyclic integrator integrates a correlation waveform, associated integration outputs with phases, and sets up a maximum detection when an integration value corresponding to a predetermined phase is detected as a maximum. A correlation peak canceller regards an integration value of a phase having the maximum detection flag as a maximum of the correlation waveform of the spreading code, generates a replica signal, and eliminates the replica signal from an output of the integration. A maximum detection unit detects a maximum in a predetermined integration period and a phase corresponding to the maximum from the output of the integration after eliminating the replica signal.

19 Claims, 13 Drawing Sheets

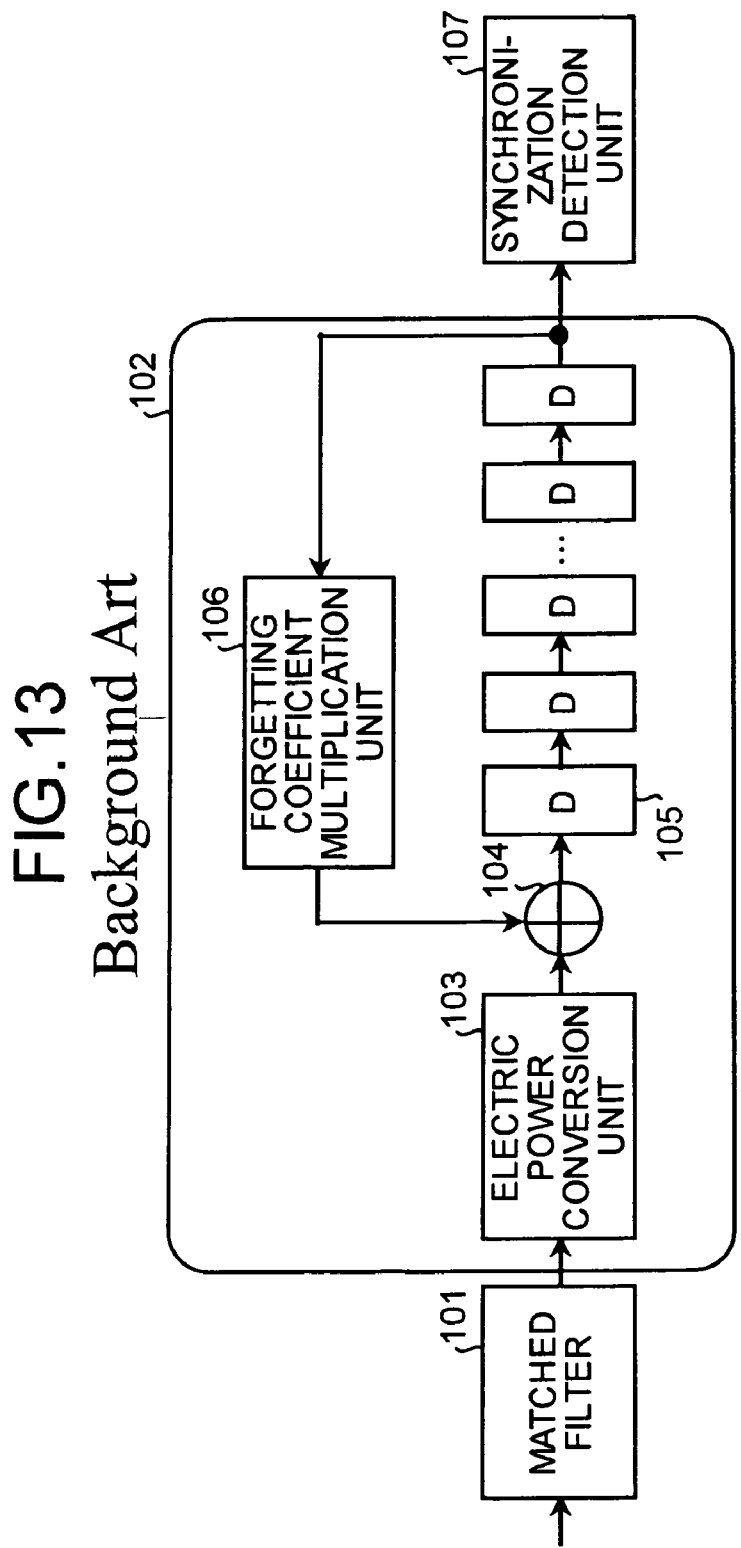

SPECTRUM SPREAD RECEPTION APPARATUS

TECHNICAL FIELD

The present invention relates to a spread spectrum receiver that performs a synchronized detection using a plurality of multiplexed spread spectrum signals. More specifically, the present invention relates to a spread spectrum receiver that may possibly be used in a propagation environment in which noise and interference exist and signal intensity fluctuates.

BACKGROUND ART

As a conventional spread spectrum receiver, an example of synchronized detection of each signal for a plurality of spread spectrum signals, in a state in which the signals are multiplexed using the same spreading code, is explained herein. It is considered that the synchronized detection for the signals is carried out in a multipath propagation environment, a transmission of signals from a plurality of transmission stations using the same spreading code, etc.

FIG. 13 is a schematic diagram of a synchronized detector in the conventional spread spectrum receiver used in above situations. The conventional spread spectrum receiver includes a matched filter 101, a cyclic integrator 102, an electric power conversion unit 103, an adder 104, an integration value storage unit 105, a forgetting coefficient multiplication unit 106, and a synchronized detection unit 107.

Since a correlation signal output from the matched filter 101 normally has a low SNIR (signal-to-noise-and-interference ratio), if correlation signals are used for synchronized detection as it is, sufficient synchronized detection characteristic cannot be achieved. To cope with the problem, the cyclic integrator 102 cyclically integrates correlation signals to improve SNIR and the synchronized detector 107 performs the synchronized detection.

After converting the outputs of the matched filter 101 into electric power, the cyclic integrator 102 performs cyclic integration; however, if the deviation of carrier wave frequency is sufficiently small, a coherent cyclic integration is often performed instead. In addition, the forgetting coefficient multiplication unit 106 may not be used in some cases.

An output of the cyclic integrator 102 is input to the synchronized detector 107 and the synchronized detector 107 detects a synchronization point of the multiplexed spread spectrum signal from the output of the cyclic integrator 102. The first detection method sorts the outputs of the cyclic integrator in descending order of amplitude and detects the synchronization point from the maximum output value in order. The second detection method sets a threshold takes a signal equal to or greater than the threshold as the synchronization point.

However, when implementing the first method on a hardware in the synchronized detector of the conventional spread spectrum receiver, the hardware disadvantageously becomes too complicated, resulting in increases of a scale of the hardware and power consumption. Furthermore, when implementing the first method on a DSP (digital signal processor), a high speed synchronized detection cannot be performed due to a decrease of processing speed, a delay caused by the interface between the hardware and the DSP, etc.

The second method of the synchronized detecting also has another disadvantage that it is difficult to control the threshold so as to secure a desired number of detected synchronization points. Namely, if the threshold is set too high, the number of detected synchronization points becomes small as compared with the number of spread spectrum signals. On the other hand, if the threshold is set too low, the probability of the erroneous detection of noise increases and a buffer provided in the synchronized detector may overflow, resulting in being unable to detect all the spread spectrum signals. Furthermore, it is difficult to control the threshold so as to make the number of detected synchronization points constant in an ordinary propagation environment in which a noise and an interference exist and a signal intensity changes.

Meanwhile, an autocorrelation waveform of the spreading code has unnecessary amplitude (side lobe) in an area away from a synchronization point (main lobe). If the synchronized detector erroneously detects the side lobe other than the main lobe, the synchronized detection characteristic of the detector deteriorates. Therefore, some methods have been conventionally used to detect only the main lobes. For example, the method disclosed in Japanese Patent Application Laid-Open No. 10-308588 calculates correlation values by taking a predetermined number of cyclic integral outputs at a certain point from the maximum value in order as main lobes, and eliminates only the side lobes from a received signal. After repeating the elimination of the side lobes by a designated number of times, a point having a maximum correlation value is set as a synchronized detection point.

With the conventional method, however, since a synchronized detection point cannot be determined unless the cancellation of side lobes is repeated by a designated number of times, there is a disadvantage in that time required for the synchronized detection increases. In addition, since it is necessary to store amplitudes and timings in descending order of amplitude so as to eliminate the side lobes, circuits implemented on the hardware disadvantageously becomes complicated, resulting in increases of a scale of the hardware and power consumption. Even when implementing the method with the DSP, a high speed synchronized detection cannot be performed due to a decrease of processing speed, delay caused by an interface between the hardware and the DSP, etc.

It is, therefore, an object of the present invention to provide a spread spectrum receiver capable of realizing a high speed synchronized detection using a small-scale circuit configuration.

DISCLOSURE OF THE INVENTION

It is an object of the present invention to at least solve the problems in the conventional technology.

The spread spectrum receiver according to one aspect of the present invention, which performs a synchronized detection based on a correlation waveform between a received signal and a reference spreading code, wherein the received signal includes a plurality of multiplexed spread spectrum signals, includes a cyclic integration unit that cyclically integrates the correlation waveform, manages integration values and phases respectively linking with each other, and sets a maximum detection flag to ON state when an integration value corresponding to a predetermined phase is detected as a maximum, a replica signal elimination unit that takes the integration value corresponding to the phase with the maximum detection flag ON as a maximum of the correlation waveform of the spreading code, generates a replica signal from the integration value corresponding to the phase with the maximum detection flag ON, and eliminates the replica signal from the cyclic integration values, and a maximum detection unit that detects a maximum and a phase corresponding to the maximum in a predetermined cyclic integration period from the cyclic integration values after eliminating the replica signal, wherein the maximum is a synchronization position.

The spread spectrum receiver according to another aspect of the present invention, which performs a synchronized detection based on a correlation waveform between a received signal and a reference spreading code, wherein the received signal is a plurality of multiplexed spread spectrum signals, includes a cyclic integration unit that cyclically integrates the correlation waveform, manages integration values and phases respectively linking with each other, and sets a maximum detection flag to ON state when an integration value corresponding to a predetermined phase is detected as a maximum, the cyclic integration unit including an internal replica signal elimination unit that takes the integration value corresponding to the phase with the maximum detection flag ON as a maximum of the correlation waveform of the spreading code, generates a replica signal from the integration value corresponding to the phase with the maximum detection flag ON, and eliminates the replica signal from the cyclic integration values, and a maximum detection unit that detects a maximum and a phase corresponding to the maximum in a predetermined cyclic integration period from the cyclic integration values after eliminating the replica signal, wherein the maximum is a synchronization position.

The spread spectrum receiver according to still another aspect of the present invention, which performs a synchronized detection based on a correlation waveform between a received signal and a reference spreading code, wherein the received signal is a plurality of multiplexed spread spectrum signals, includes a cyclic integration unit that cyclically integrates the correlation waveform, manages integration values and phases respectively linking with each other, and sets a maximum detection flag to ON state when an integration value corresponding to a predetermined phase is detected as a maximum, an integration value detection unit that detects a predetermined number of integration values and phases corresponding to the integration values from the maximum in descending order of magnitude, a first replica signal elimination unit that takes an integration value of the cyclic integration values corresponding to the predetermined number of phases as a maximum of a correlation waveform of the spreading code, generates a first replica signal from the integration value, and eliminates the first replica signal from the cyclic integration values, a second replica signal elimination unit that takes the integration value corresponding to the phase with the maximum detection flag set up as a maximum of the correlation waveform of the spreading code, generates a second replica signal from the integration value, and eliminates the second replica signal from outputs of the first replica signal elimination unit, and a maximum detection unit that detects a maximum and a phase corresponding to the maximum in a predetermined cyclic integration period from the cyclic integration values after eliminating the replica signal, wherein the maximum is a synchronization position.

The spread spectrum receiver according to still another aspect of the present invention, which performs a synchronized detection based on a correlation waveform between a received signal and a reference spreading code, wherein the received signal is a plurality of multiplexed spread spectrum signals, includes a cyclic integration unit that cyclically integrates the correlation waveform, manages integration values and phases respectively linking with each other, a phase management unit that manages all the previously detected phases corresponding to maximums in a predetermined cyclic integration period, a replica signal elimination unit that takes an integration value corresponding to a phase equal to the phase managed by the phase management unit as a maximum of the correlation waveform of the spreading code, generates a replica signal from the integration value, and eliminates the replica signal from the cyclic integration values, and a maximum detection unit that detects a maximum and a phase corresponding to the maximum in a predetermined cyclic integration period from the cyclic integration values after eliminating the replica signal, wherein the maximum is a synchronization position.

The other objects, features and advantages of the present invention are specifically set forth in or will become apparent from the following detailed descriptions of the invention when read in conjunction with the accompanying drawings.

BRIEF DESCRIPTION OF THE DRAWINGS

Exemplary embodiments of the spread spectrum receiver of the present invention will be explained with reference to the accompanying drawings.

FIG. 13 is a schematic diagram of a synchronized detector in a conventional spread spectrum receiver.

BEST MODES FOR CARRYING OUT THE INVENTION

The embodiments of a spread spectrum receiver according to the present invention will be explained hereinafter in detail with reference to the drawings. It should be noted that the present invention is not limited by these embodiments.

Figure 1:
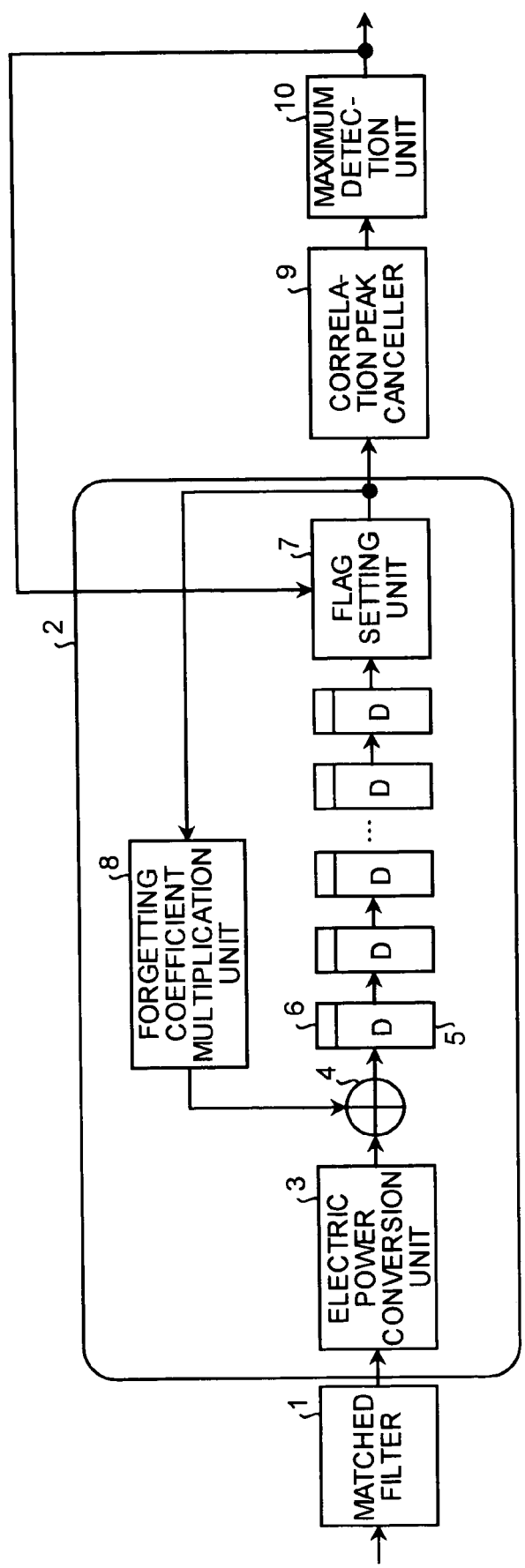
FIG. 1 is a schematic diagram of a spread spectrum receiver according to a first embodiment of the present invention.

FIG. 1 is a schematic diagram of a spread spectrum receiver according to a first embodiment of the present invention. In FIG. 1, reference symbol 1 denotes a matched filter, 2 denotes a cyclic integrator, 3 denotes an electric power conversion unit; 4 denotes an adder, 5 denotes an integration value storage unit, 6 denotes an after-detection flag storage unit, 7 denotes a flag setting unit, 8 denotes a forgetting coefficient multiplication unit, 9 denotes a correlation peak canceller, 10 denotes a maximum detection unit. For the convenience of explanation, only the configuration of the spread spectrum receiver related to synchronized detection will be explained herein.

The synchronized detection operation of the spread spectrum receiver in the embodiment constituted as explained above will next be explained.

The matched filter 1 receives multiplexed spread spectrum signals and outputs a correlation waveform showing the correlation between each of the received signals and a spreading code. If the received signal does not include noise or interference, the time at which the absolute value of the correlation waveform output becomes a maximum corresponds to the synchronization point of the spreading code by which the received signal is multiplied.

The cyclic integrator 2 converts the correlation waveform output from the matched filter 1 into electric power and performs cyclic integration. By repeating the cyclic integration, the SNIR of the correlation waveform is improved and the capability of detecting the synchronization point of the spreading code is thereby improved.

The operation of the cyclic integrator 2 will be explained in detail. The electric power conversion unit 3 receives the correlation waveforms output from the matched filter 1 and converts the correlation waveforms into electric power. The adder 4 adds up the output of the electric power conversion unit 3 and the output of the forgetting coefficient multiplication unit 8. The outputs of the adder 4 are sequentially fed to an integration value storage unit 5 and an after-detection flag storage unit 6 constituted in the form of shift registers. The length of this shift-register-form arrangement corresponds to the cycle of the cyclic integration. The flag setting unit 7 operates the value (state) stored in the after-detection flag storage unit 6. In this embodiment, the flag setting unit 7 inputs a phase with which the maximum detection unit 10, to be explained later, detects a maximum. The flag setting unit 7 compares this phase with the phase of the input signal input thereto. If the phases are coincident, the flag setting unit 7 sets up a flag in the corresponding after-detection flag storage unit 6. The forgetting coefficient multiplication unit 8 multiplies the value of the integration value storage unit 5, as the output of the flag setting unit 7, by a coefficient of forgetting and outputs the multiplication result as well as the state of the after-detection flag storage unit 6 to the adder 4.

The correlation peak canceller 9 regards the integration value of the phase, with which the flag is set up in the after-detection flag storage unit 6, output from the cyclic integrator 2 as the maximum of the correlation waveform, generates the autocorrelation waveform (replica) of the spreading code, and eliminates this autocorrelation waveform from each of the outputs of the cyclic integrator 2 sequentially fed from the cyclic integrator 2.

The maximum detection unit 10 observes the integration values sequentially fed from the correlation peak canceller 9 for a period of time equal to one cyclic integration cycle and detects the maximum of the integration values as a synchronization point. The maximum detection unit 10 transmits the phase of the detected maximum integration value to the flag setting unit 7 in the cyclic integrator 2.

In this embodiment, through this operation, the synchronization points of the respective spread spectrum signals are detected in descending order of amplitude from the received signals that are the superposed spread spectrum signals spread with the same spreading code.

Figure 2:
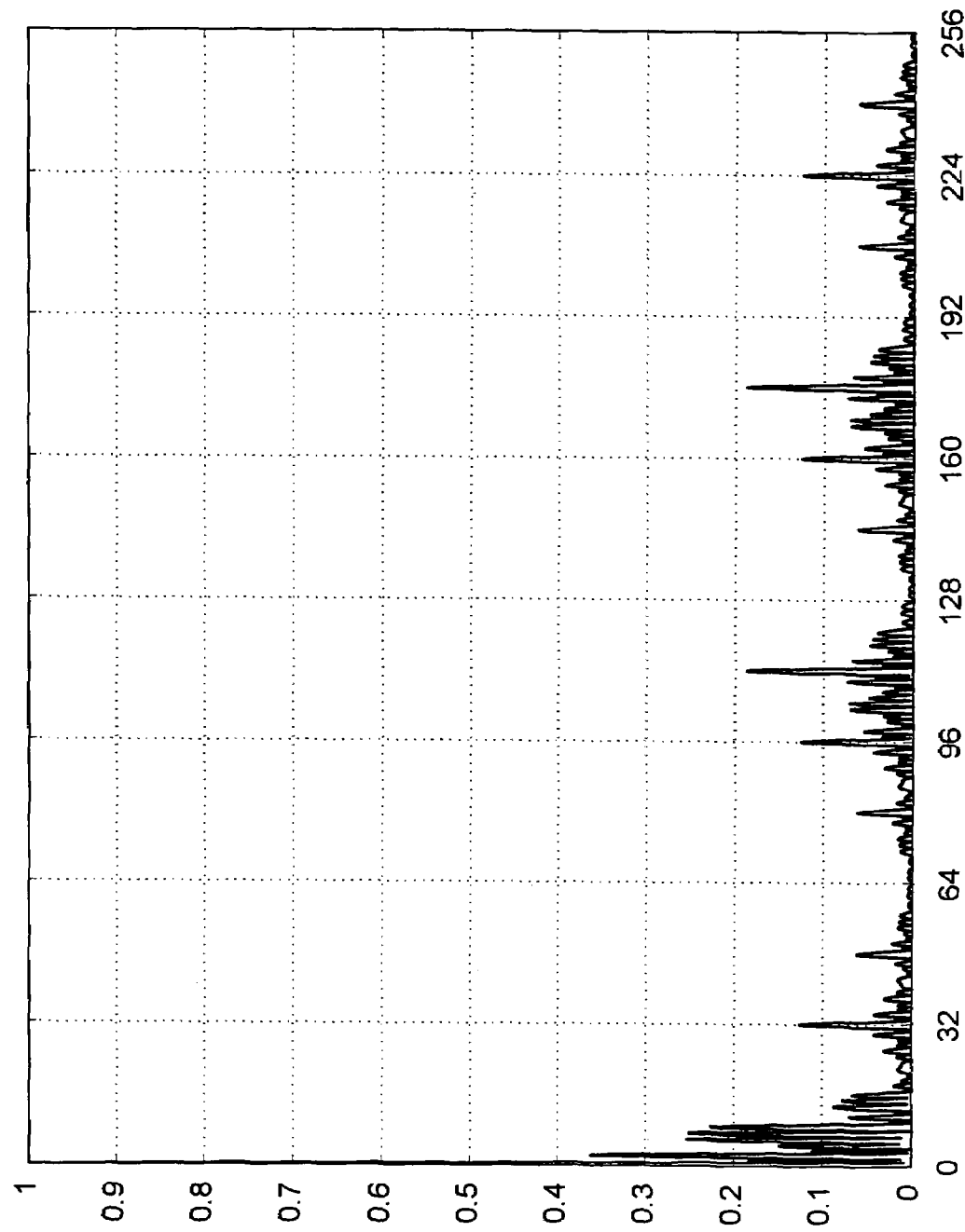
FIG. 2 is a graph of absolute values of an autocorrelation waveform of a spreading code.
Figure 3:
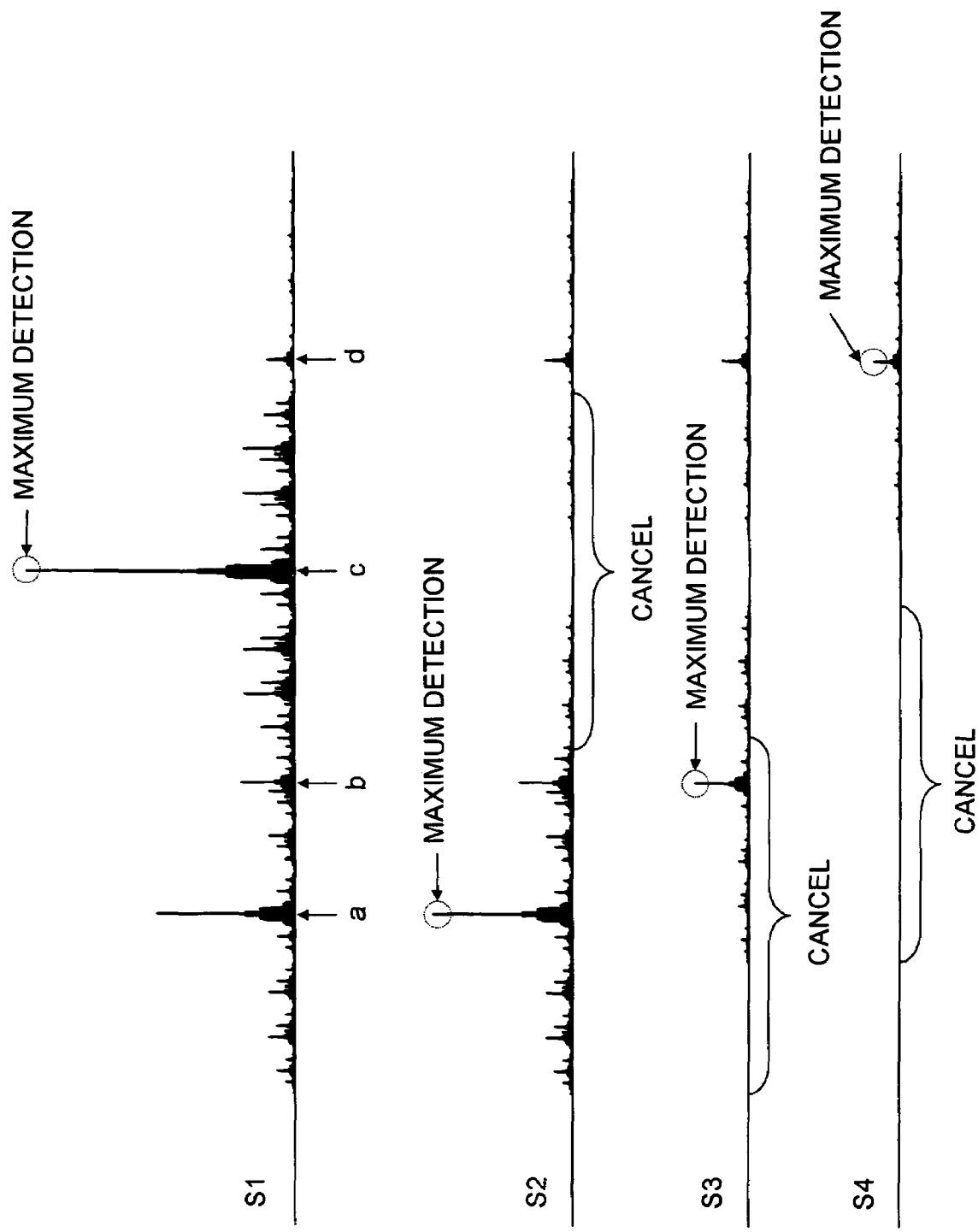
FIG. 3 is a set of graphs of an output of a correlation peak canceller when a plurality of spread spectrum signals that are spread with a spreading code having characteristics shown in FIG. 2 is received.

FIG. 2 is a graph of one example of the absolute value of the autocorrelation waveform of the spreading code. In FIG. 2, the horizontal axis represents phase and the vertical axis represents the absolute value of the autocorrelation waveform standardized to the maximum. In FIG. 2, a phase 0 shows a synchronization point. FIG. 3 are examples of the output of the correlation peak canceller 9 when a plurality of spread spectrum signals spread with the spreading code having the characteristic shown in FIG. 2 are received. In FIG. 3, the horizontal axis represents time and the vertical axis represents amplitude.

S1 of FIG. 3, for example, shows the output of the correlation peak canceller 9 just before synchronized detection. In the S1, synchronization points of the respective received signals exist at points a, b, c, and d. S2 shows the output of the correlation peak canceller 9 during the next maximum detection operation to the S1 in the operation of detecting the point c as a maximum. In S2, the part of the autocorrelation waveform having the point c as a maximum detected previously is cancelled. If maximum detection is performed at this moment, the point a is detected as a synchronization point. Likewise, by repeating the maximum detection and cancellation, the points b and d are detected as synchronization points in S3 and S4, respectively.

As can be seen, in this embodiment, the signals detected as maximum integration values are cancelled and thereby eliminated, so that the maximum detection unit does not detect the already detected synchronization points of the spread spectrum signals again. Therefore, if signals that are a plurality of multiplexed spread spectrum signals are received, it is possible to sequentially detect synchronization for the spread spectrum signals in descending order of intensity. In addition, since the correlation peak canceller eliminates the maximum integration values, the synchronized detection for the respective spread spectrum signals can be realized solely by the maximum detection unit. Therefore, as compared with the receiver which eliminates only the side lobes of the autocorrelation waveforms, it is possible to realize a spread spectrum receiver having a small-sized hardware configuration.

Further, in this embodiment, since synchronized detection can be carried out while the cyclic integrator is actuated, the advantage of SNIR improvement is attained for the signals having lower intensities and detected at later time thanks to the cyclic integration. This means that the synchronized detection method with the configuration shown in FIG. 1 enables synchronized detection for the received signals having lower intensities and enables synchronized detection for the received signals having higher intensities in shorter detection operation time.

Furthermore, in this embodiment, even if the signals that are the multiplexed spread spectrum signals are received and the main lobes of the autocorrelation waveforms of the spread spectrum signals having relatively low intensities are buried in the side lobes of the spread spectrum signals having relatively high intensities, the autocorrelation waveforms of the spread spectrum signals are sequentially cancelled in the descending order of intensity. Therefore, it is possible to detect the synchronization points of the spread spectrum signals having lower intensities without erroneously detecting the side lobes of the spread spectrum signals having higher intensities.

Moreover, in this embodiment, the number of detected synchronization points is proportional to the number of maximum detection operations. Therefore, by controlling the number of maximum detection operations, it is possible to control the number of signals for which synchronized detection is carried out.

The correlation peak canceller in this embodiment eliminates the autocorrelation waveform. However, each eliminated signal is not always, strictly coincident with the autocorrelation waveform. If a method for eliminating only parts having high amplitudes from the autocorrelation waveform shown in, for example, FIG. 2, particularly eliminating only the range of several chips around the maximum having a particularly high amplitude or a method for eliminating the autocorrelation waveform using values obtained by subtracting an average from the maximums is used, it is possible to attain the same advantages.

Further, even if the levels of the eliminated signals are controlled based on the SNIR or the like of the received signals, it is possible to attain the same advantages as those explained above. For example, if the SNIR is low, the side lobe of the correlation waveform as the output of the cyclic integration is lower in amplitude than the main lobe thereof. Therefore, by setting the level of the side lobe of a generated replica signal lower than that of the main lobe, it is possible to realize a more effective cancellation operation.

Additionally, in this embodiment, one maximum is detected within one cyclic integration period. However, even if a plurality of maximums are detected in descending order of amplitude among the maximums and a plurality of flags are set by the flag setting unit 7, accordingly, it is possible to attain the same advantages. In this alternative, how many spread spectrum signals are subjected to synchronized detection per cyclic integration period is determined by the tradeoff between hardware scale and processing time.

Figure 4:
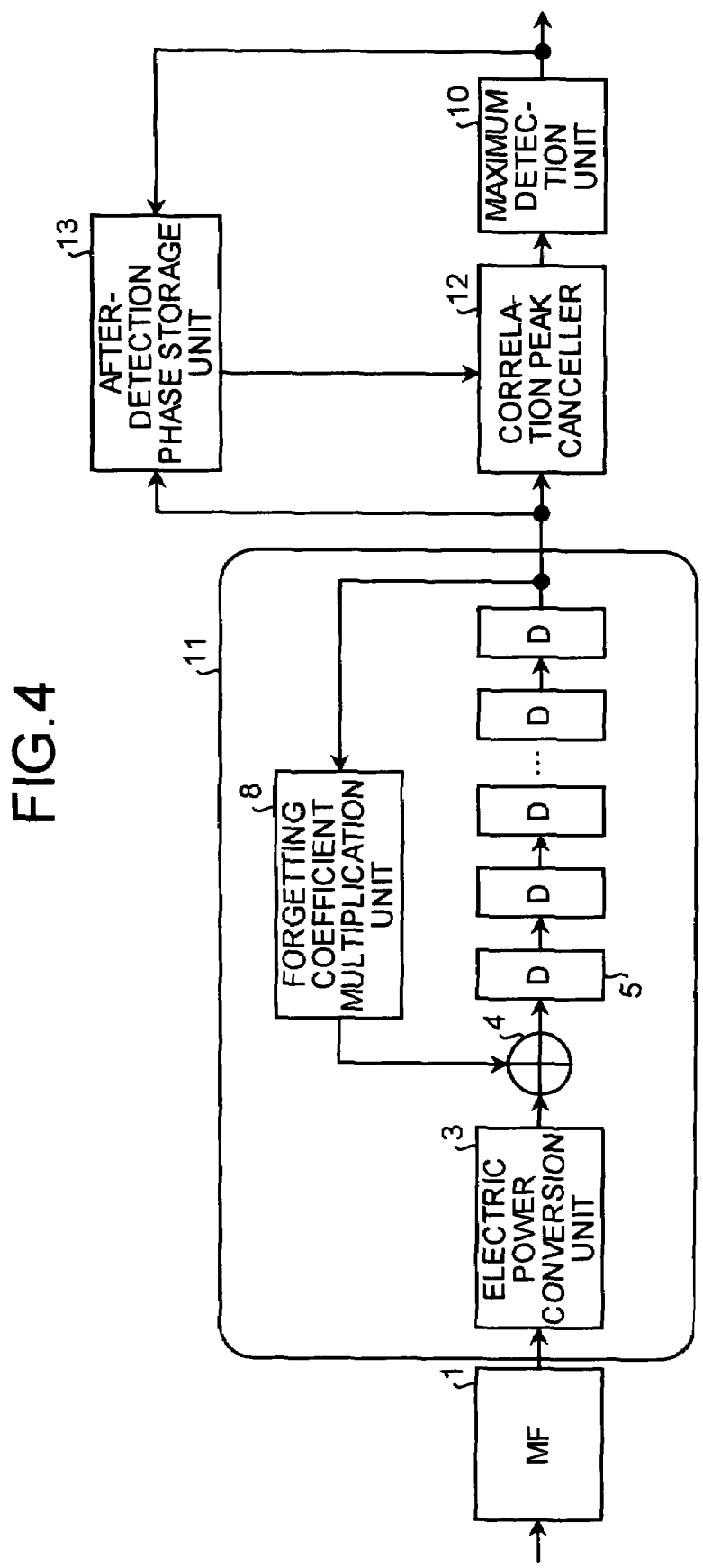
FIG. 4 is a schematic diagram of a spread spectrum receiver according to a second embodiment of the present invention.

FIG. 4 is a schematic diagram of a spread spectrum receiver according to a second embodiment of the present invention. In FIG. 4, reference symbol 11 denotes a cyclic integrator, 12 denotes a correlation peak canceller, and 13 denotes an after-detection phase storage unit. In this embodiment, differently from the first embodiment, the location of storing a phase with which a maximum is detected is outside of the cyclic integrator 2. It is noted that the same constituent elements as those in the first embodiment are denoted by the same reference symbols, respectively and will not be explained herein.

In the second embodiment, the after-detection phase storage unit 13 stores the phase of the detected maximum for each detection operation. The after-detection phase storage unit 13 compares the output phase of the cyclic integrator 11 with the after-detection phase. The correlation peak canceller 12 eliminates an autocorrelation waveform having the integration value of the after-detection phase as a maximum from each of the outputs of the cyclic integrator 11 in response to an indication from the after-detection phase storage unit 13. The correlation peak canceller 12 outputs the elimination result to the maximum detection unit 10. The maximum detection unit 10 detects a maximum as a synchronization point in each cyclic integration period, and outputs the phase with which the maximum is detected to the after-detection phase storage unit 13.

As can be seen, in the second embodiment, the spread spectrum receiver is constituted to further record the after-detection phase at the location outside of the cyclic integrator. Therefore, it is possible to perform cancellation operation before the integration value of the after-detection phase is output from the cyclic integrator. Consequently, it is possible to attain the same advantages as those of the first embodiment and realize higher rate synchronized detection.

Figure 5:
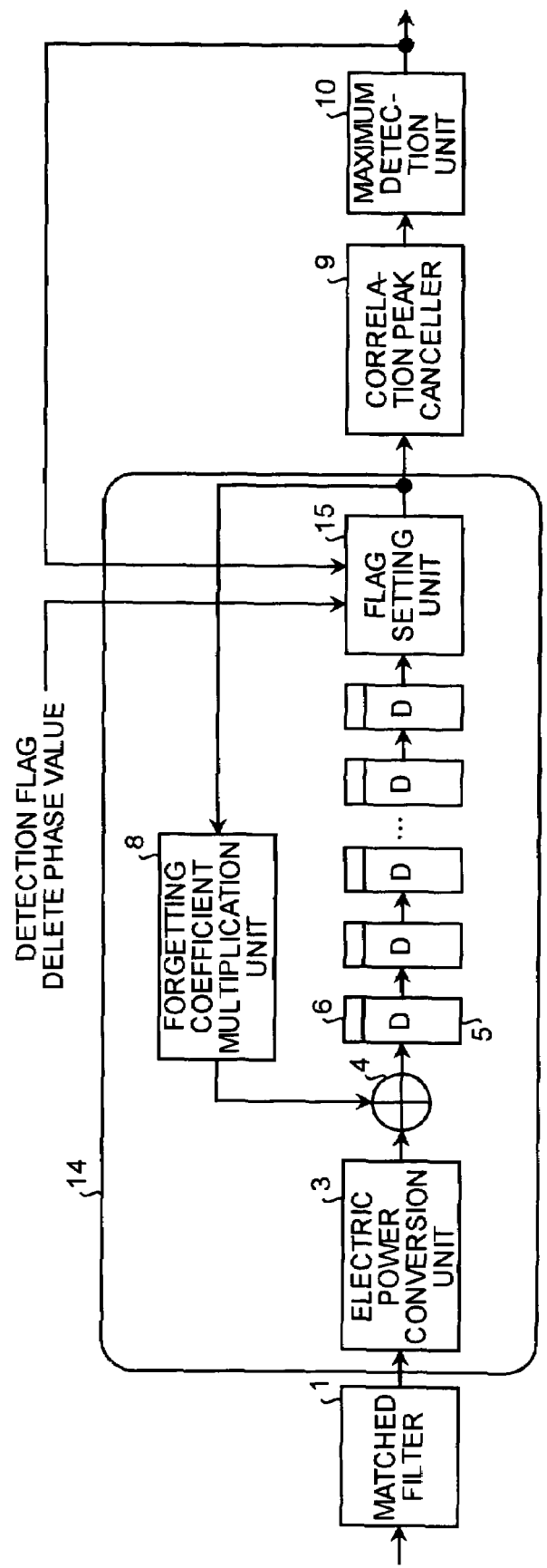
FIG. 5 is a schematic diagram of a spread spectrum receiver according to a third embodiment of the present invention.

FIG. 5 is a schematic diagram of a spread spectrum receiver according to a third embodiment of the present invention. In FIG. 5, reference symbol 14 denotes a cyclic integrator and 15 denotes a flag setting unit. It is noted that the same constituent elements as those in the first and the second embodiments are denoted by the same reference symbols, respectively and will not be explained herein.

The flag setting unit 15 has not only a function of setting up a flag in the after-detection flag setting unit 6 but also a function of deleting an already set, after-detection flag. Specifically, if the phase for deleting the after-detection flag received from the outside is equal to the phase of one of the cyclic integration values and an after-detection flag is set up with the phase, then the after-detection flag is deleted and the deletion result is output to the correlation peak canceller.

As can be seen, in the third embodiment, the spread spectrum receiver is constituted to have the after-detection flag deletion function besides the after-detection flag setting function. By deleting the flag corresponding to the phase with which the maximum is previously detected, it is possible to add this phase to maximum detection candidates again. Consequently, it is possible to attain the same advantages as those of the first embodiment and efficiently prevent synchronization error if the intensities of the spread spectrum signals previously detected are lowered by the influence of propagation path variation or the like or if synchronization timing is changed.

Figure 6:
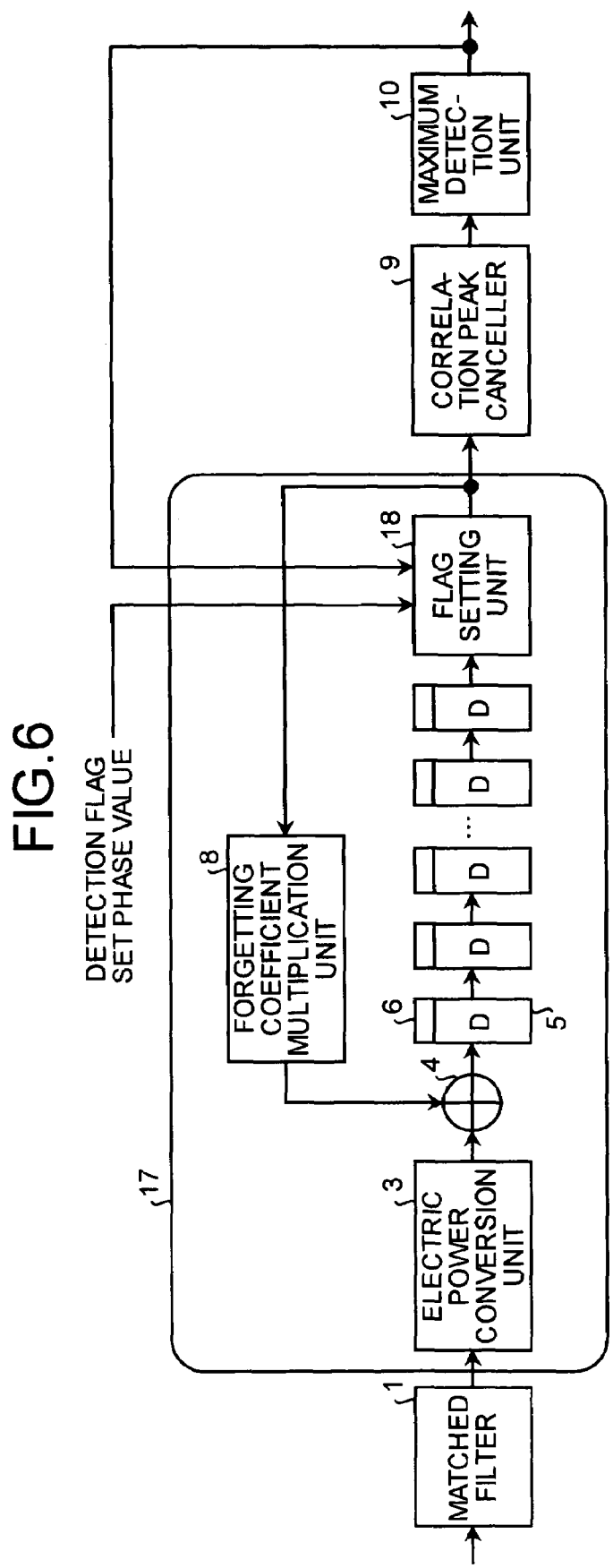
FIG. 6 is a schematic diagram of a spread spectrum receiver according to a fourth embodiment of the present invention.

FIG. 6 is a schematic diagram of a spread spectrum receiver according to a fourth embodiment of the present invention. In FIG. 6, reference symbol 17 denotes a cyclic integrator and 18 denotes a flag setting unit. It is noted that the same constituent elements as those in the first to the third embodiments are denoted by the same reference symbols, respectively and will not be explained herein.

In this embodiment, an after-detection flag stored in the after-detection flag storage unit 6 is set based on the output of the maximum detection unit 10 and the flag can be also set from the outside. Specifically, the flag setting unit 18 compares the phase of the integration value received from the integration value storage unit 5 with an after-detection phase output from the maximum detection unit 10 and a phase for setting the after-detection flag from the outside. If the phase of the integration value received from the integration value storage unit 5 is equal to at least one of the latter phases, the flag setting unit 18 set up an after-detection flag in the after-detection flag storage unit 6.

As can be seen, in the fourth embodiment, the spread spectrum receiver is constituted to be able to set the after-maximum-detection flag even in response to an external indication. Therefore, it is possible for a higher layer or the like to forcedly set up a flag with a phase with which the presence of a spread spectrum signal is already known. It is thereby possible to attain the same advantages as those of the first embodiment and improve the synchronized detection performance of the receiver for spread spectrum signals.

In this embodiment, the after-detection flag setting phase and the after-detection flag deletion phase in the third embodiment may be equal. For example, if the after-detection flag setting phase is coincident with the phase of the integration value from the integration value storage unit 5 and the after-detection flag storage unit 6 and no flag is set up in the after-detection flag storage unit 6, a flag is set up therein. If a flag is already set up in the after-detection flag storage unit 6, this flag is deleted. By using the same phase as the after-detection setting phase and the after-detection flag deletion phase, the number of input/output interfaces between the cyclic integrator 17 and the outside of the integrator 17 decreases and the receiver can be made smaller in circuit scale.

Figure 7:
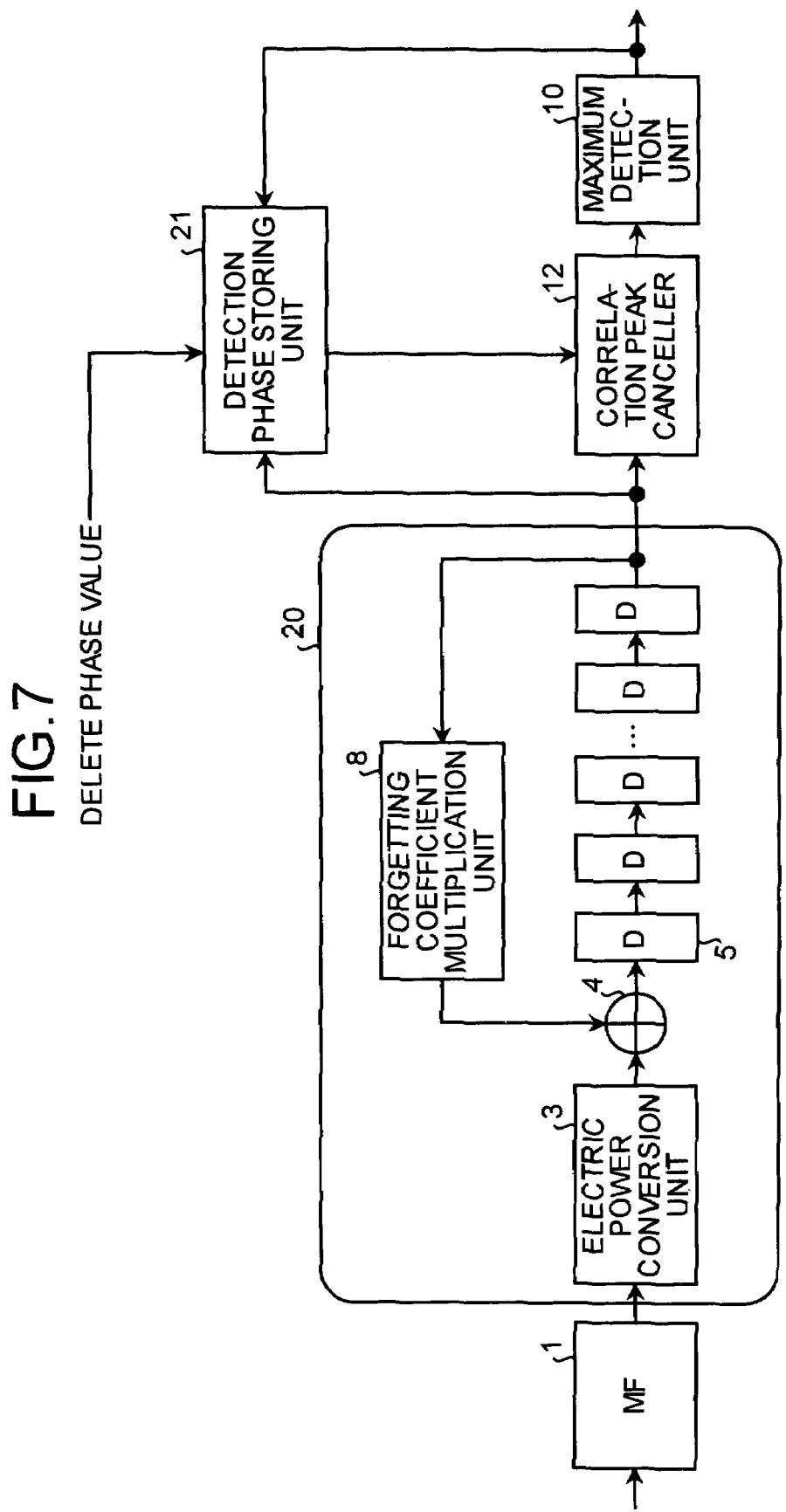
FIG. 7 is a schematic diagram of a spread spectrum receiver according to a fifth embodiment of the present invention.

FIG. 7 is a schematic diagram of a spread spectrum receiver according to a fifth embodiment of the present invention. In FIG. 7, reference symbol 20 denotes a cyclic integrator and 21 denotes an after-detection phase storage unit. It is noted that the same constituent elements as those in the first to the fourth embodiments are denoted by the same reference symbols, respectively and will not be explained herein.

The after-detection phase storage unit 21 in this embodiment, differently from the after-detection phase storage unit 13 in the second embodiment, is constituted to be able to receive a deletion phase from the outside. Specifically, if one of the stored phases coincides with the deletion phase received from the outside, the after-detection phase storage unit 21 deletes the coincident phase.

As can be seen, in this embodiment, the spread spectrum receiver further has a function of deleting the phase with which synchronization is already detected. Therefore, by deleting the phase with which the maximum is detected previously, it is possible to add this phase to maximum detection candidates again. Consequently, it is possible to attain the same advantages as those of the second embodiment and efficiently prevent synchronization error if the intensities of the spread spectrum signals previously detected are lowered by the influence of propagation path variation or the like or if synchronization timing is changed.

Figure 8:
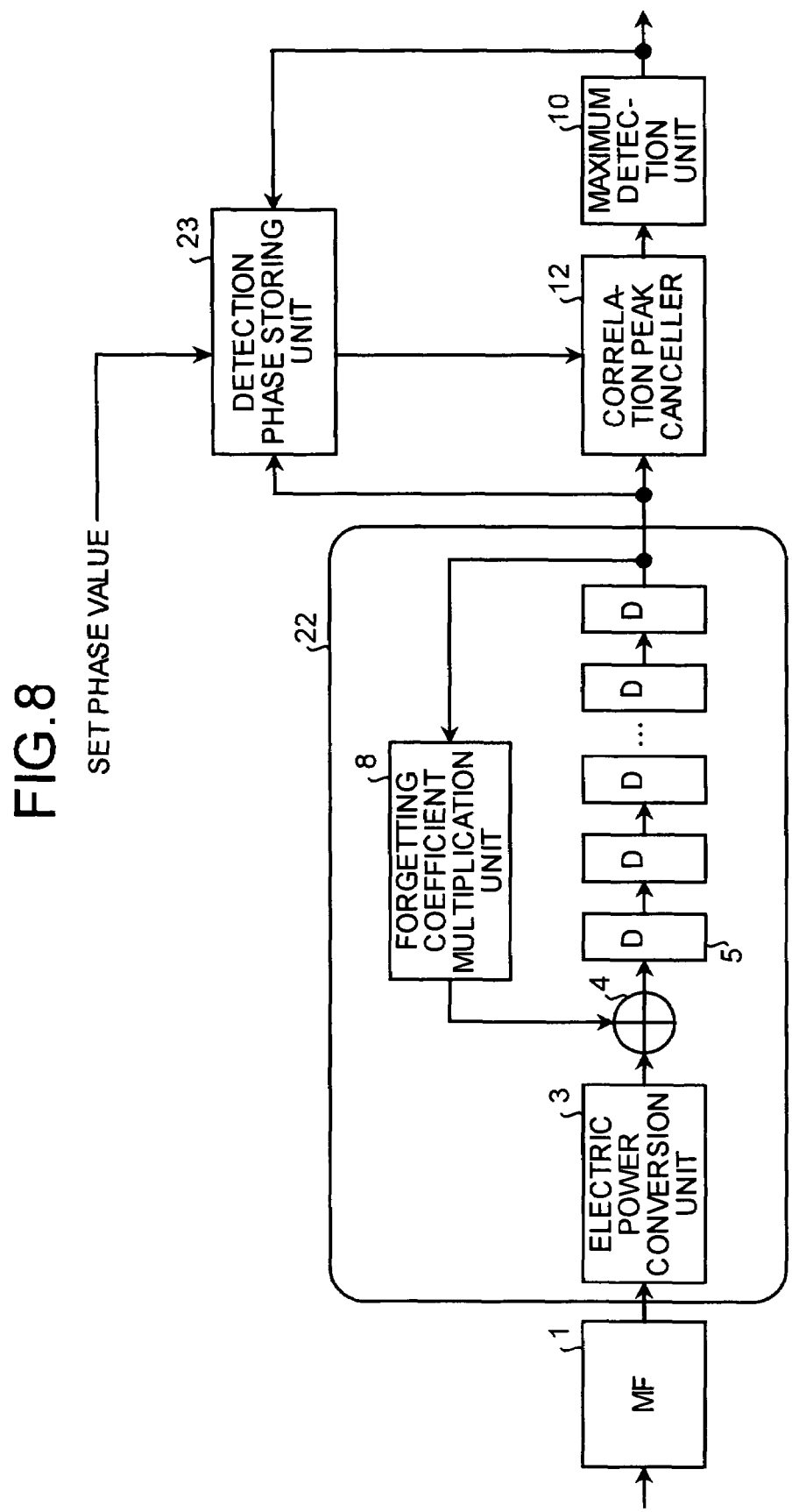
FIG. 8 is a schematic diagram of a spread spectrum receiver according to a sixth embodiment of the present invention.

FIG. 8 is a schematic diagram of a spread spectrum receiver according to a sixth embodiment of the present invention. In FIG. 8, reference symbol 22 denotes a cyclic integrator and 23 denotes an after-detection phase storage unit. It is noted that the same constituent elements as those in the first to fifth embodiments are denoted by the same reference symbols, respectively and will not be explained herein.

In this embodiment, a phase stored in the after-detection phase storage unit 23 is set based on the output of the maximum detection unit 10 and the phase can be also set from the outside. Specifically, the after-detection phase storage unit 23 stores an after-detection phase output from the maximum detection unit 10 and a setting phase from the outside.

As can be seen, in this embodiment, the spread spectrum receiver is constituted to be able to set a phase even in response to an external indication. Therefore, it is possible to forcedly set a phase with which the presence of a spread spectrum signal is already known. It is thereby possible to attain the same advantages as those of the second embodiment and improve the synchronized detection performance of the receiver for spread spectrum signals.

In this embodiment, the set phase and the deletion phase in the third embodiment may be equal. For example, if the set phase is coincident with the stored phase, the phase is deleted. If the set phase is not stored, the phase is newly stored. By using the same phase as the set phase and the deleted phase, the number of input/output interfaces between the cyclic integrator 22 and the outside of the integrator 22 decreases and the receiver can be made smaller in circuit scale.

Figure 9:
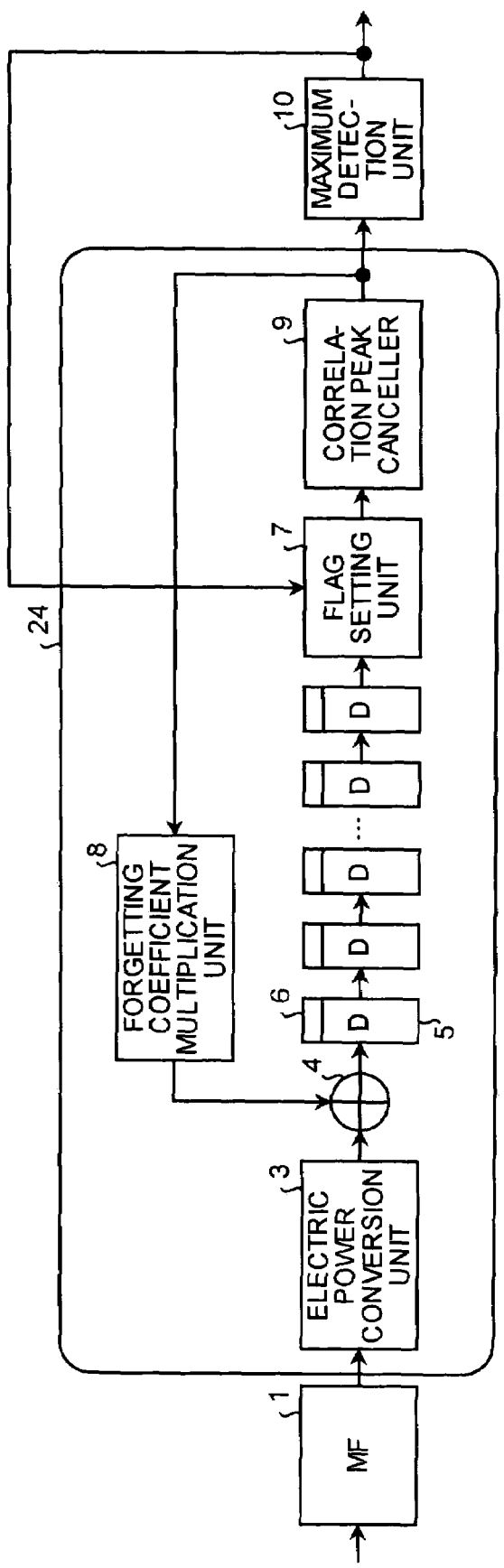
FIG. 9 is a schematic diagram of a spread spectrum receiver according to a seventh embodiment of the present invention.

FIG. 9 is a schematic diagram of a spread spectrum receiver according to a seventh embodiment of the present invention. In FIG. 9, reference symbol 24 denotes a cyclic integrator. It is noted that the same constituent elements as those in the first to sixth embodiments are denoted by the same reference symbols, respectively and will not be explained herein.

In the seventh embodiment, differently from the first embodiment, the correlation peak canceller 9 is included in the cyclic integrator 24. The cyclic integrator 24 performs cyclic integration while the output of the correlation peak canceller 9, i.e., the result of eliminating an autocorrelation waveform from the received signal for which synchronization is already detected is output to the forgetting coefficient multiplication unit 8.

As can be seen, even if the correlation peak canceller 9 is included in the cyclic integrator 24, it is possible to attain the same advantages as those of the first embodiment. The configuration of the spread spectrum receiver in which the correlation peak canceller is included in the cyclic integrator is also applicable to the second embodiment. In that case, it is possible to further attain the same advantages as those of the second embodiment.

Figure 10:
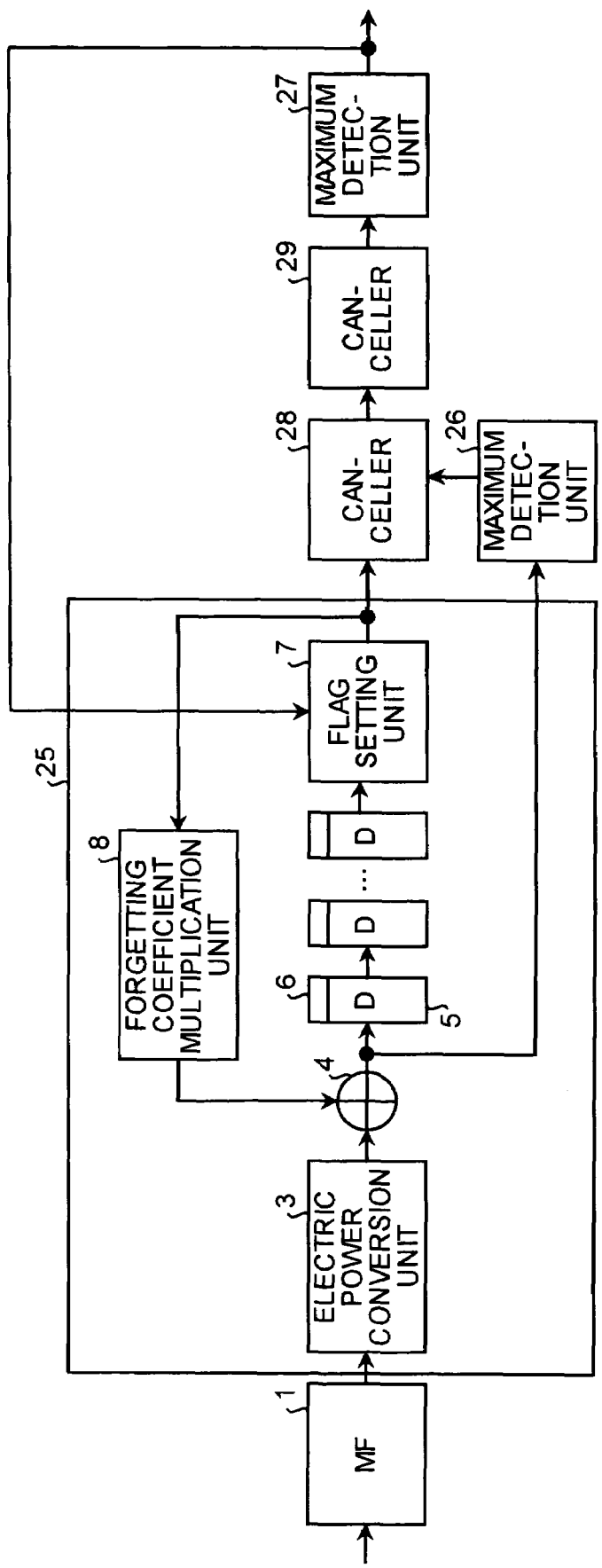
FIG. 10 is a schematic diagram of a spread spectrum receiver according to a eighth embodiment of the present invention.

FIG. 10 is a schematic diagram of a spread spectrum receiver according to an eighth embodiment of the present invention. In FIG. 10, reference symbol 25 denotes a cyclic integrator, 26 and 27 denote maximum detection units, and 28 and 29 denote correlation peak cancellers. It is noted that the same constituent elements as those in the first to seventh embodiments are denoted by the same reference symbols, respectively and will not be explained herein.

The maximum detection unit 26 detects N maximums (where N is a natural number) among those output from the adder 4 in the cyclic integrator 25 in descending order of magnitude and holds the phases of the N maximums in each cyclic integration period.

The correlation peak canceller 28 receives the amplitudes and phases of the N detected maximums, generates N replicas of spreading code correlation waveforms corresponding to the amplitudes and phases of the respective N maximums, and eliminates the replicas from the integration values output from the cyclic integrator 25, respectively. If an after-detection flag is set up for one of the integration values output from cyclic integrator 25 that corresponds to one of the phases received from the maximum detection unit 26, the canceller 28 deletes the flag.

The correlation peak canceller 29 generates a replica of an autocorrelation waveform for each phase with which the after-detection flag is set up, and eliminates the maximum of the autocorrelation waveform and parts of side lobes having higher amplitudes from each of the received signals.

The maximum detection unit 27 observes the outputs of the correlation peak canceller 29 over one cyclic integration cycle and outputs a phase with which the signal has the highest amplitude and the amplitude.

Figure 11:
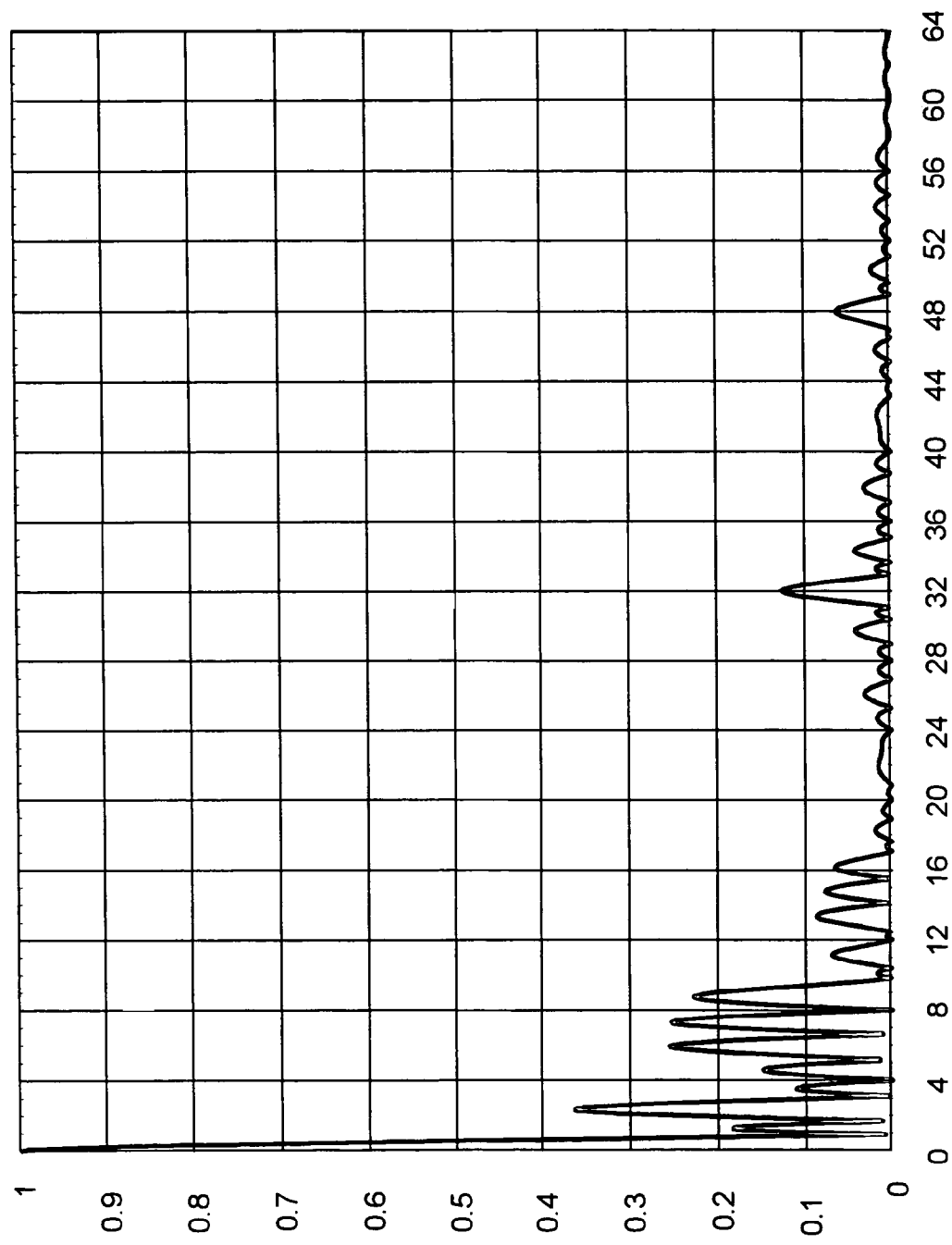
FIG. 11 is a graph of an example of the autocorrelation waveform of a spreading code.

FIG. 11 is a graph of one example of the autocorrelation waveform of the spreading code. In FIG. 11, parts of the side lobes having higher amplitudes concentrate on the surrounding of the maximum of the autocorrelation function (phase 0). Due to this, the correlation peak canceller 29 eliminates, from the received signal, only the maximum of the autocorrelation waveform and the narrow range thereof around the maximum.

Figure 12:
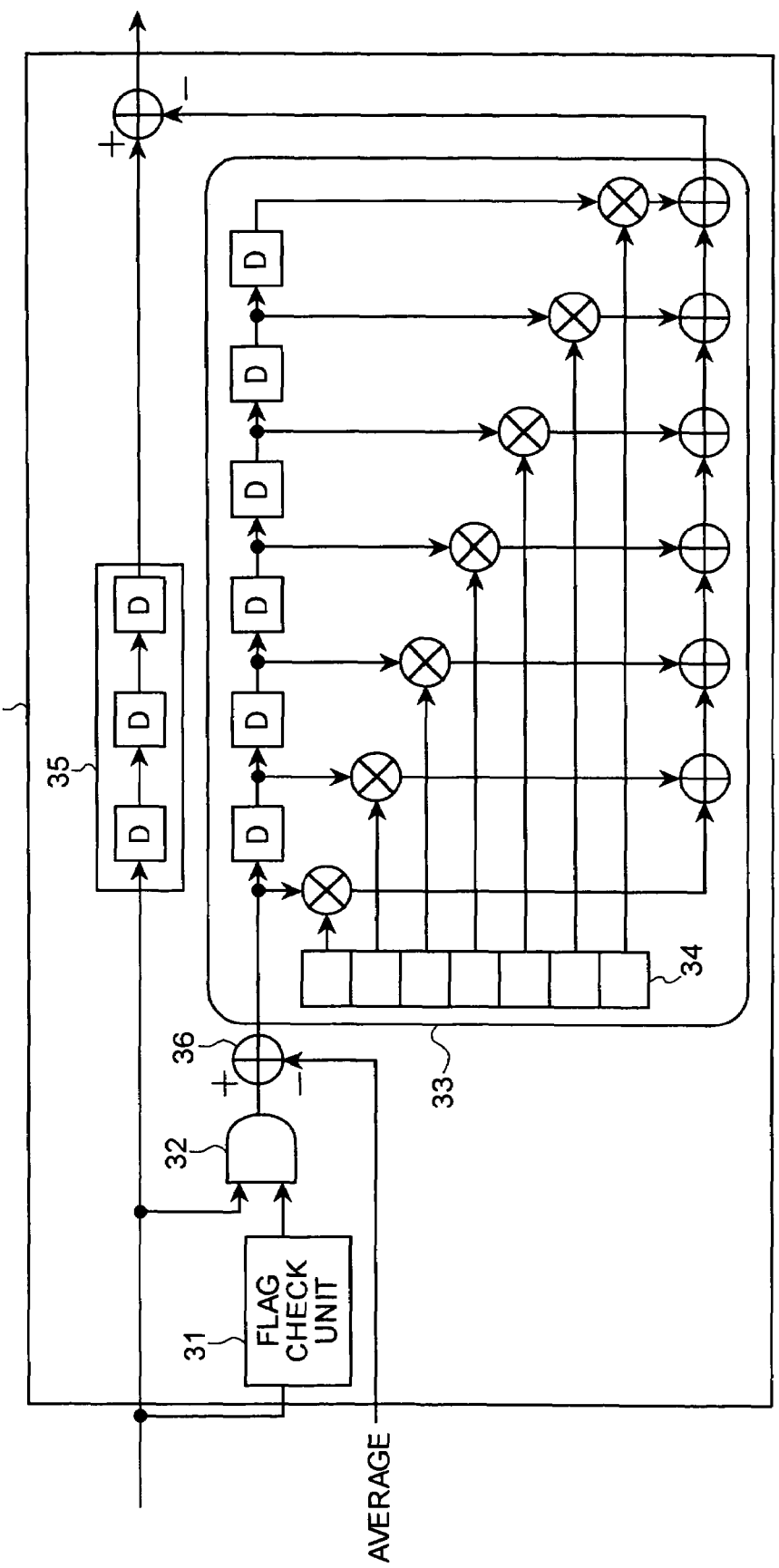
FIG. 12 is a schematic diagram of an example of a correlation peak canceller 29.

FIG. 12 shows an example of the circuit configuration of the correlation peak canceller 29 which realizes this elimination method. In FIG. 12, reference symbol 31 denotes a flag check unit, 32 denotes a gate, 33 denotes a replica generation unit, 34 denotes a tap coefficient unit, 35 denotes a delay compensation unit, and 36 denotes a subtracter.

The operation of the correlation peak canceller 29 will now be explained. The flag check unit 31 checks the after-detection flag of an input signal and sets the gate 32 in an ON state if the flag is set up. In the ON state, the gate 32 outputs the input signal to the subtracter 36, and the subtracter 36 subtracts the average of the outputs of the cyclic integrator 25 for one cyclic period from the input signal.

The replica generation unit 33 is expressed as an FIR filter type replica generation unit by way of example. The tap coefficient unit 34 stores the maximum of the autocorrelation waveform and correlation values around the maximum in a narrow range. The replica generation unit 33 inputs the output of the subtracter 36, i.e., a value obtained by subtracting the cyclic integration average from the integration value with the phase with which the synchronization is detected, and outputs an autocorrelation waveform centered around the after-detection phase.

The delay compensator 35 delays the input signal by delay time generated by the replica generation unit 33. The correlation peak canceller 29 finally outputs a signal obtained by eliminating the autocorrelation waveform from the delayed input signal.

As can be seen, in this embodiment, the two cancellers are used to conduct cancellation operation over the entire cyclic integrator to several received signals having high amplitudes since the amplitudes of the side lobes of these signals are high. In addition, the two cancellers conduct cancellation operation to the remaining signals in a limited range of high amplitudes since the amplitudes of the side lobes of these signals are low. By doing so, it is possible to attain the same advantages as those of the first embodiment. In addition, as compared with the spread spectrum receiver which cancels all the received signals over the wide range of each cyclic integration period, it is possible to suppress circuit scale, processing quantity and the like to be low and realize the equivalent detection performance.

The flag setting unit 15 in the third embodiment of the flag setting unit 18 in the fourth embodiment may be used in place of the flag setting unit 7 in this embodiment. In that case, it is possible to further attain the same advantages as those of the third or the fourth embodiment.

Furthermore, in this embodiment, the spread spectrum receiver may be constituted to include the correlation peak cancellers 28 and 29 in the cyclic integrator 25. In that case, it is possible to further attain the same advantages as those of the seventh embodiment.

As explained so far, according to the present invention, the replica elimination unit eliminates the maximum integration values. Therefore, it is possible to realize the synchronized detection for the respective spread spectrum signals solely by the maximum detection unit. It is thereby advantageously possible to realize a spread spectrum receiver having a smaller-sized hardware configuration than the receiver which eliminates only the side lobes of the autocorrelation waveforms. Further, it is advantageously possible to attain the advantage of SNIR improvement for the signals having lower intensities and detected at later time thanks to the cyclic integration and to perform synchronized detection for the received signals having higher intensities in shorter detection operation time. Furthermore, even if the main lobes of the autocorrelation waveforms of the spread spectrum signals having relatively low intensities are buried in the side lobes of the spread spectrum signals having relatively high intensities, the autocorrelation waveforms of the spread spectrum signals are sequentially cancelled in the descending order of intensity. Therefore, it is possible to detect the synchronization points of the spread spectrum signals having lower intensities without erroneously detecting the side lobes of the spread spectrum signals having higher intensities.

According to the next invention, even if the replica elimination unit is included in the cyclic integration unit, it is advantageously possible to realize a small-sized hardware configuration. In addition, it is advantageously possible to attain the advantage of SNIR improvement for the signals having lower intensities and detected at later time thanks to the cyclic integration and to perform synchronized detection for the received signals having higher intensities in shorter detection operation time. Furthermore, even if the main lobes of the autocorrelation waveforms of the spread spectrum signals having relatively low intensities are buried in the side lobes of the spread spectrum signals having relatively high intensities, the autocorrelation waveforms of the spread spectrum signals are sequentially cancelled in the descending order of intensity. Therefore, it is possible to detect the synchronization points of the spread spectrum signals having lower intensities without erroneously detecting the side lobes of the spread spectrum signals having higher intensities.

According to the next invention, the two replica elimination units are used to conduct cancellation operation over the entire cyclic integrator to several received signals having high amplitudes since the amplitudes of the side lobes of these signals are high. In addition, the two cancellers conduct cancellation operation for the remaining signals in a limited range of high amplitudes since the amplitudes of the side lobes of these signals are low. By doing so, it is advantageously possible to attain the same advantages as those of the first embodiment. In addition, as compared with the spread spectrum receiver which cancels all the received signals over the wide range of each cyclic integration period, it is advantageously possible to suppress circuit scale, processing quantity and the like to be low and realize the equivalent detection performance.

According to the next invention, by deleting the flag corresponding to the phase with which the maximum is previously detected, it is possible to add this phase to maximum detection candidates again. It is thereby advantageously possible to efficiently prevent synchronization error if the intensities of the spread spectrum signals previously detected are lowered by the influence of propagation path variation or the like or if synchronization timing is changed.

According to the next invention, the spread spectrum receiver is constituted to be able to set the after-maximum-detection flag even in response to an external indication. Therefore, it is possible for a higher layer or the like to forcedly set up a flag with a phase with which the presence of a spread spectrum signal is already known. It is thereby advantageously possible to improve the synchronized detection performance of the receiver for spread spectrum signals.

According to the next invention, the spread spectrum receiver is constituted to detect a plurality of maximums in descending order of amplitude. Therefore, it is advantageously possible to determine how many spread spectrum signals are subjected to synchronized detection per cyclic integration period by the tradeoff between hardware scale and processing time.

According to the next invention, the spread spectrum receiver is constituted to record the after-detection phase at the location outside of the cyclic integration unit. Therefore, it is possible to perform cancellation operation before the integration value of the after-detection phase is output from the cyclic integration unit. It is thereby advantageously possible to realize higher rate synchronized detection.

According to the next invention, by deleting the phase with which the maximum is detected previously, it is possible to add this phase to maximum detection candidates again. It is thereby advantageously possible to efficiently prevent synchronization error if the intensities of the spread spectrum signals previously detected are lowered by the influence of propagation path variation or the like or if synchronization timing is changed.

According to the next invention, the spread spectrum receiver is constituted to be able to set a phase even in response to an external indication. Therefore, it is possible to forcedly set a phase with which the presence of a spread spectrum signal is already known. It is thereby advantageously possible to improve the synchronized detection performance of the receiver for spread spectrum signals.

According to the next invention, the spread spectrum receiver is constituted to control the level of the replica signal based on the SNIR of the received signals. It is thereby advantageously possible to realize more effective cancellation operation.

INDUSTRIAL APPLICABILITY

The spread spectrum receiver according to the present invention is effective for a radio communication using spread spectrum signals and particularly suited for a receiver used in a propagation environment in which a noise and an interference exist and a signal intensity changes.

The invention claimed is:

1. A spread spectrum receiver that performs a synchronized detection based on a correlation waveform between a received signal and a reference spreading code, wherein the received signal includes a plurality of multiplexed spread spectrum signals, the spread spectrum receiver comprising:
   a cyclic integration unit that cyclically integrates the correlation waveform, manages cyclic integration values and corresponding phases, and sets a maximum detection flag to an ON state when an integration value corresponding to a predetermined phase is detected as a maximum;
   a replica signal elimination unit that takes the integration value having an ON-state maximum detection flag as a maximum of the correlation waveform of the spreading code, generates a replica signal from the integration value, and eliminates the replica signal from the cyclic integration values; and
   a maximum detection unit that detects a new maximum integration value and a new phase corresponding to the new maximum integration value in a predetermined cyclic integration period from the cyclic integration values after eliminating the replica signal, wherein the new maximum integration value corresponds to a synchronization position.

2. The spread spectrum receiver according to claim 1, wherein the cyclic integration unit includes a mechanism configured to receive a phase value used to change a state of the maximum detection flag, wherein
   if the received phase value is equal to a first phase corresponding to a first cyclic integration value, and if the maximum detection flag is set to the ON state for the first cyclic integration value, the cyclic integration unit sets the maximum-detection flag to an OFF state.

3. The spread spectrum receiver according to claim 1, wherein the cyclic integration unit includes a mechanism configured to receive a phase value used to set a maximum detection flag, wherein
   if the received phase value is equal to a first phase corresponding to a first cyclic integration value, the cyclic integration unit sets the maximum detection flag to the ON state for the first cyclic integration value.

4. The spread spectrum receiver according to claim 1, wherein the cyclic integration unit selects a predetermined number of maximum integration values in descending order of magnitude, and sets the maximum detection flag to the ON state for all the selected integration values.

5. The spread spectrum receiver according to claim 1, wherein
   the replica signal elimination unit controls amplitude characteristics of the replica signal based on a signal-to-noise-and-interference ratio.

6. A spread spectrum receiver that performs a synchronized detection based on a correlation waveform between a received signal and a reference spreading code, wherein the received signal includes a plurality of multiplexed spread spectrum signals, the spread spectrum receiver comprising:
   a cyclic integration unit that cyclically integrates the correlation waveform, manages integration values and corresponding phases, and sets a maximum detection flag to an ON state when an integration value corresponding to a predetermined phase is detected as a maximum, the cyclic integration unit including an internal replica signal elimination unit that takes the integration value having an ON-state maximum detection flag as a maximum of the correlation waveform of the spreading code, generates a replica signal from the integration value, and eliminates the replica signal from the cyclic integration values; and
   a maximum detection unit that detects a new maximum integration value and a new phase corresponding to the new maximum in a predetermined cyclic integration period from the cyclic integration values after eliminating the replica signal, wherein the new maximum integration value corresponds to a synchronization position.

7. The spread spectrum receiver according to claim 6, wherein the cyclic integration unit includes a mechanism configured to receive a phase value used to change a state of the maximum detection flag, wherein
   if the received phase value is equal to a first phase corresponding to a first cyclic integration value, and if the maximum detection flag is set to the ON state for the first cyclic integration value, the cyclic integration unit sets the maximum-detection flag to an OFF state.

8. The spread spectrum receiver according to claim 6, wherein the cyclic integration unit includes a mechanism configured to receive a phase value used to set a maximum detection flag, wherein
   if the received phase is equal to a first phase corresponding to a first cyclic integration value, the cyclic integration unit sets the maximum detection flag to the ON state for the first cyclic integration value.

9. The spread spectrum receiver according to claim 6, wherein the cyclic integration unit selects a predetermined number of maximum integration values in descending order of magnitude, and sets the maximum detection flag to the ON state for all the selected integration values.

10. The spread spectrum receiver according to claim 6, wherein the replica signal elimination unit controls amplitude characteristics of the replica signal based on a signal-to-noise-and-interference ratio.

11. A spread spectrum receiver that performs a synchronized detection based on a correlation waveform between a received signal and a reference spreading code, wherein the received signal includes a plurality of multiplexed spread spectrum signals, the spread spectrum receiver comprising:
a cyclic integration unit that cyclically integrates the correlation waveform, manages cyclic integration values and corresponding phases, and sets a maximum detection flag to an ON state when an integration value corresponding to a predetermined phase is detected as a maximum;
an integration value detection unit that detects a predetermined number of maximum integration values and phases corresponding to the maximum integration values in descending order of magnitude;
a first replica signal elimination unit that takes a maximum integration value of the maximum cyclic integration values as a maximum of the correlation waveform of the spreading code, generates a first replica signal from the integration value, and eliminates the first replica signal from the cyclic integration values;
a second replica signal elimination unit that takes the integration value having an ON-state maximum detection flag as a maximum of the correlation waveform of the spreading code, generates a second replica signal from the integration value, and eliminates the second replica signal from outputs of the first replica signal elimination unit; and
a maximum detection unit that detects a new maximum integration value and a new phase corresponding to the new maximum integration value in a predetermined cyclic integration period from the cyclic integration values after eliminating the first and second replica signals, wherein the new maximum integration value corresponds to a synchronization position.

12. The spread spectrum receiver according to claim 11, wherein the cyclic integration unit includes a mechanism configured to receive a phase value used to change a state of the maximum detection flag, wherein
if the received phase value is equal to a first phase corresponding to a first cyclic integration value, and if the maximum detection flag is set to the ON state for the first cyclic integration value, the cyclic integration unit sets the maximum-detection flag to an OFF state.

13. The spread spectrum receiver according to claim 11, wherein the cyclic integration unit includes a mechanism configured to receive a phase value used to set a maximum detection flag, wherein
if the received phase is equal to a first phase corresponding to a first cyclic integration value, the cyclic integration unit sets the maximum detection flag to the ON state for the first cyclic integration value.

14. The spread spectrum receiver according to claim 11, wherein the cyclic integration unit selects a second predetermined number of maximum integration values in descending order of magnitude, and sets the maximum detection flag to the ON state for all the selected integration values.

15. The spread spectrum receiver according to claim 11, wherein
the first replica signal elimination unit controls amplitude characteristics of the replica signal based on a signal-to-noise-and-interference ratio.

16. A spread spectrum receiver that performs a synchronized detection based on a correlation waveform between a received signal and a reference spreading code, wherein the received signal includes a plurality of multiplexed spread spectrum signals, the spread spectrum receiver comprising:
a cyclic integration unit that cyclically integrates the correlation waveform, and manages cyclic integration values and corresponding phases;
a phase management unit, provided outside the cyclic integration unit, that stores and manages all phases corresponding to maximum integration values previously detected in a predetermined cyclic integration period;
a replica signal elimination unit that takes an integration value corresponding to a first phase equal to a phase managed by the phase management unit as a maximum of the correlation waveform of the spreading code, generates a replica signal from the integration value, and eliminates the replica signal from the cyclic integration values; and
a maximum detection unit that detects a new maximum integration value and a new phase corresponding to the new maximum integration value in a predetermined cyclic integration period from the cyclic integration values after eliminating the replica signal, wherein the new maximum integration value corresponds to a synchronization position.

17. The spread spectrum receiver according to claim 16, wherein the phase management unit includes a mechanism configured to receive a phase value, wherein, if the phase value is received, the phase management unit deletes the received phase value from the phases that the phase management unit manages.

18. The spread spectrum receiver according to claim 16, wherein the phase management unit includes a mechanism configured to receive a phase value, wherein, if the phase value is received, the phase management unit adds the received phase value to a phase list to be managed by the phase management unit.

19. The spread spectrum receiver according to claim 16, wherein
the replica signal elimination unit controls amplitude characteristics of the replica signal based on a signal-to-noise-and-interference ratio.

* * * * *